Feb. 19, 1957  M. R. OSTROW  2,781,676
MACHINE FOR SAWING BUTTON CORES
Filed Feb. 4, 1955  3 Sheets-Sheet 1

INVENTOR
MILAN RICHARD OSTROW
BY
Moses, Nolte, Crews & Berry
ATTORNEYS

Feb. 19, 1957   M. R. OSTROW   2,781,676
MACHINE FOR SAWING BUTTON CORES
Filed Feb. 4, 1955   3 Sheets-Sheet 2
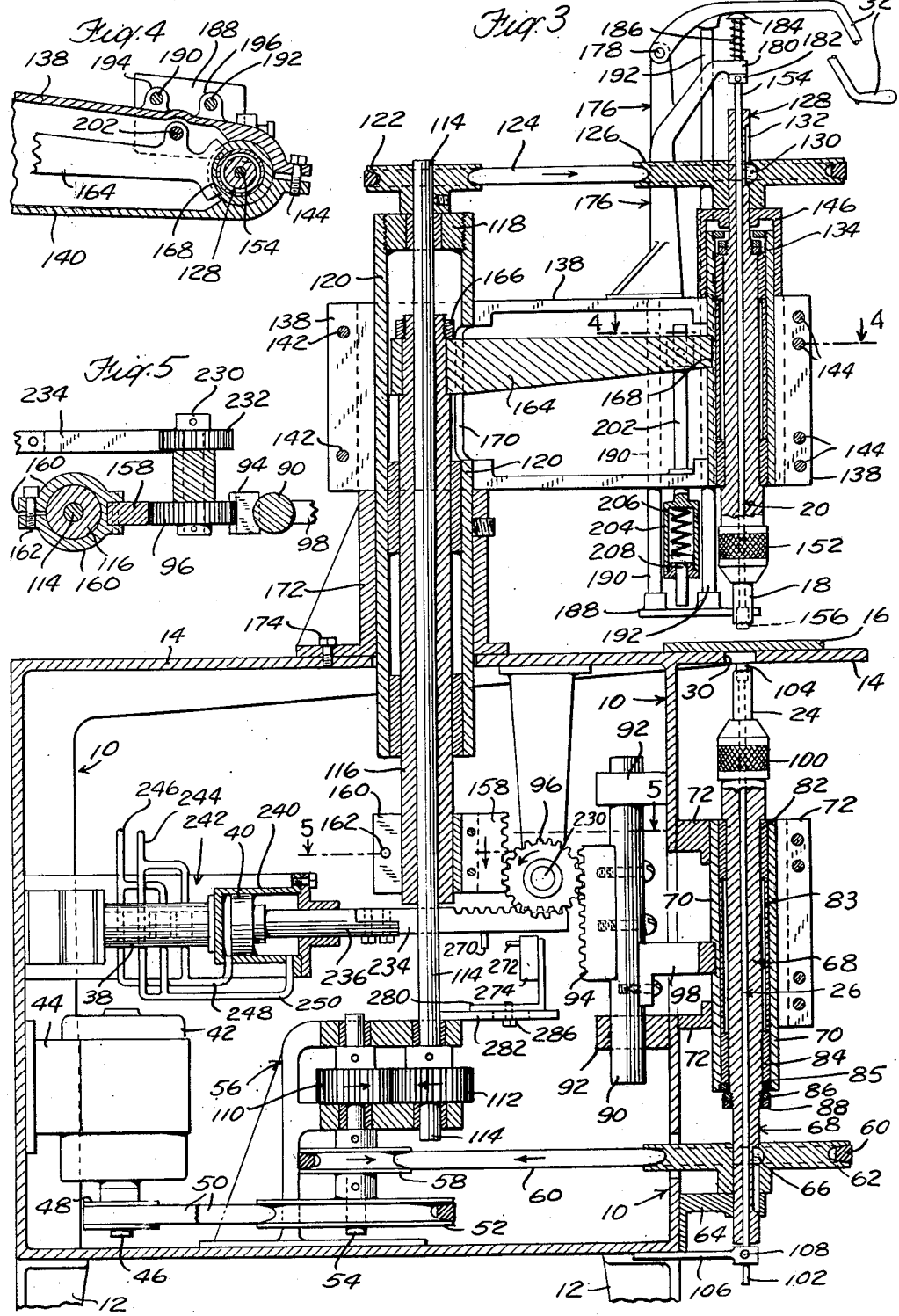

Feb. 19, 1957 M. R. OSTROW 2,781,676
MACHINE FOR SAWING BUTTON CORES
Filed Feb. 4, 1955 3 Sheets-Sheet 3
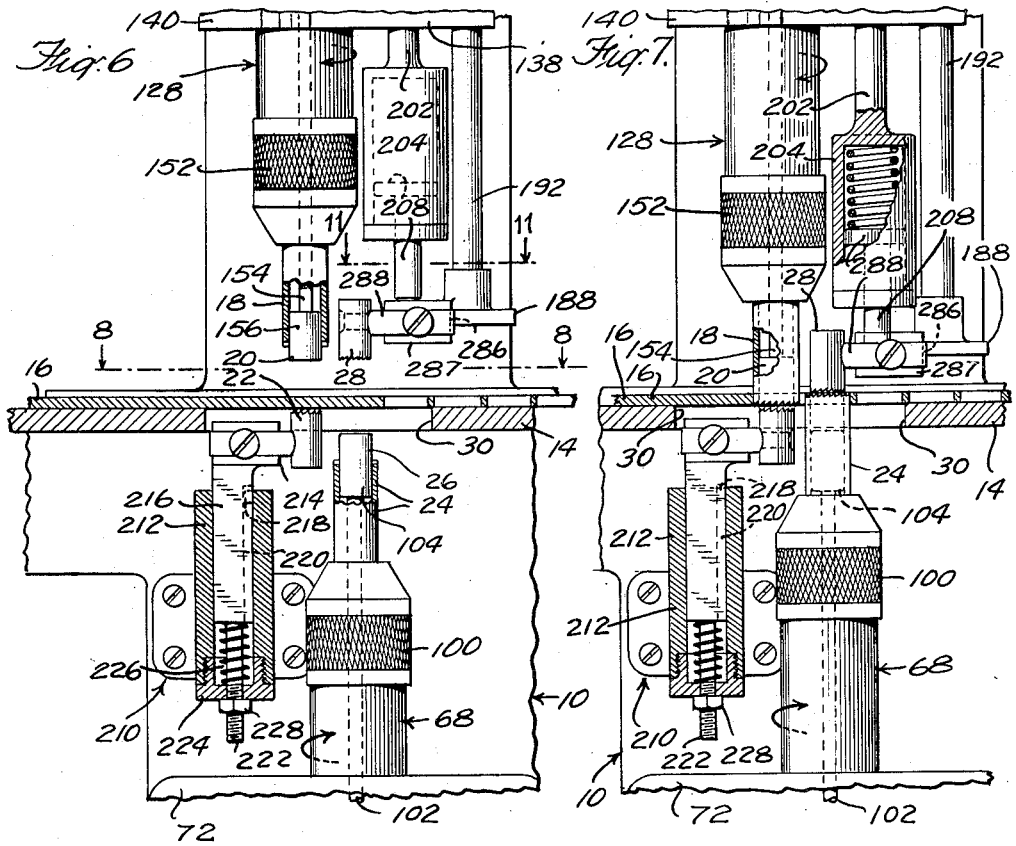
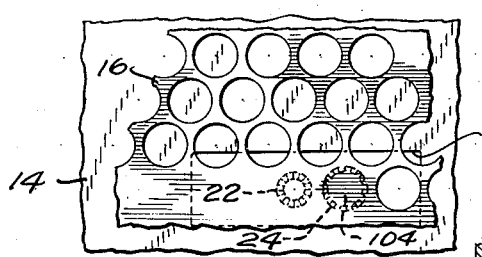
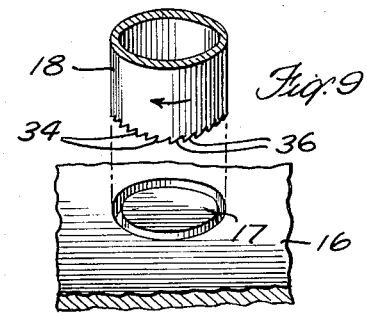
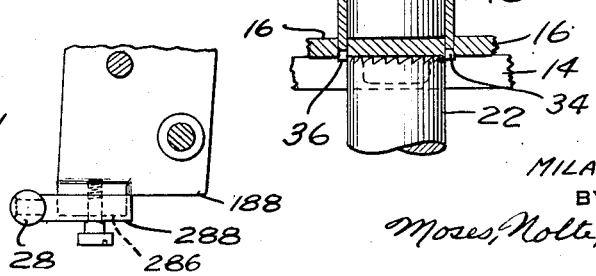
INVENTOR
MILAN RICHARD OSTROW
BY
Moses, Nolte, Crews + Berry
ATTORNEYS United States Patent Office 2,781,676
Patented Feb. 19, 1957

2,781,676

MACHINE FOR SAWING BUTTON CORES

Milan R. Ostrow, Fairlawn, N. J., assignor to Standard Button Machine Co., Inc., Paterson, N. J., a corporation of New York Application February 4, 1955, Serial No. 486,047

11 Claims. (Cl. 79—16)

This invention relates to button core or button blank sawing machines. The invention is useful either for cutting cores from ocean shells which are later to be sliced into button blanks or for cutting button blanks directly from sheets of plastic material.

According to the best known practice of the prior art for obtaining cores from shells, a shell is held in the left hand with gloves or pliers against a back-peg while a core is cut from it. A single rotary tubular saw is mounted for rotation about a horizontal axis, and also for movement axially toward and from the back-peg by means of a hand lever. The tubular saw is first located against the shell by operating the lever with the right hand and is then fed through the shell by further operation of the lever with the right hand. When the shell has been pierced the hand lever is operated to withdraw the tubular saw, and this causes the cut core to be knocked from the saw by a stationary ramrod which passes axially through the saw and saw spindle.

Operators of this type of machine must be highly skilled because the handling of the work with one hand while simultaneously manipulating the saw to, through and then away from the work with the other requires a high degree of manual dexterity. Such highly skilled labor necessarily commands a high rate of pay.

The demand for the shells exceeds the available supply, causing the shell material to be expensive. In order that the greatest possible number of cores of a given size may be obtained from the shell, it is important that the core bores be formed in the shell with the least practicable clearance. Because of the necessity for crowding the bores together, it has not been feasible to provide for boring a plurality of cores simultaneously.

It is a primary object of the present invention to enable a plurality of cores to be formed from closely contiguous areas at a single operation, this result being brought about by the provision of two saws, mounted to act simultaneously in opposite directions from the opposite sides of the shell.

It is a further very important object of the invention to simplify the handling of the work and the mechanism for the operator, so that the rate of production may be increased, the frequency of wasteful damage may be reduced, and the degree of skill required of the operator may be reduced to a marked degree.

Features of the invention include the provision of (1) a plurality of tubular saws arranged for movement toward the work from opposite directions to bore into the work from opposite sides simultaneously; (2) means for visually guiding the operator in locating the shell relative to the saws; (3) means arranged to be manually tripped and when so tripped to produce an automatic single cycle of operations in the course of which both constantly rotating saws advance toward the work, penetrate the work to cut cores, recede far enough to clear the work and to cause the cores to be knocked out of the saws by ramrods, and then to come to rest with the saws still rotating; and (4) means for relatively adjusting the saw spindles to produce minimum bore spacings for all of the different available saw diameters, and for producing corresponding spacings of the back-pegs, the ramrods, and other appurtenant parts while maintaining the operative condition of all the parts.

Other objects and advantages will hereinafter appear.

In the drawing forming part of this specification,

Figure 3 is a view in sectional elevation taken on the line 3—3 of Figure 1, looking in the direction of the arrows;

Figure 4 is a horizontal sectional view taken on the line 4—4 of Figure 3, looking in the direction of the arrows;

Figure 5 is a horizontal sectional view taken on the line 5—5 of Figure 3, looking in the direction of the arrows;

Figure 6 is a fragmentary sectional view in front elevation, on a larger scale than Figure 1, showing the saws, back-pegs and associated parts in their normal, fully retracted positions;

Figure 7 is a view similar to Figure 6 showing the parts at the conclusion of the boring strokes of the saws;

Figure 8 is a sectional view taken on the line 8—8 of Figure 6, looking in the direction of the arrows;

Figure 9 is a perspective sectional view, on a larger scale than Figures 6 to 8, showing a saw in withdrawn position and a button blank cut by the saw in the position occupied by it immediately at the conclusion of cutting;

Figure 10 is a fragmentary detail view in vertical section showing the upper saw, upper ramrod and lower back-peg in the positions occupied by them relative to one another and to a blank or core and a sheet of button material at the conclusion of the boring stroke; and Figure 11 is a fragmentary, sectional view, taken on the line 11—11 of Figure 6, looking in the direction of the arrows.

Figures 1, 2:
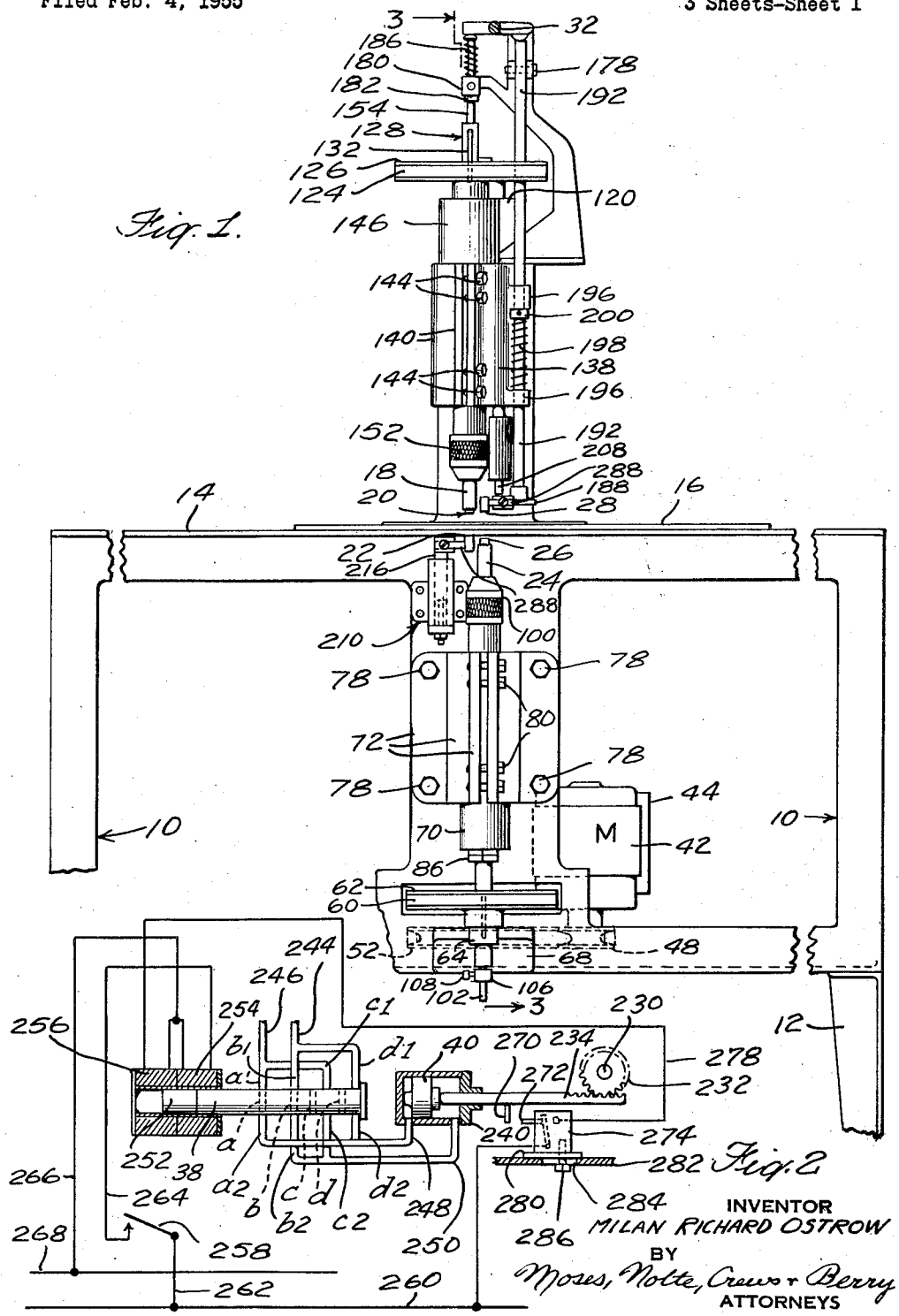
Figure 1 is a fragmentary view, in front elevation, partly broken away, and broken away intermediate its ends for compactness, showing an illustrative machine which embodies important features of the present invention.
Figure 2 is a view, largely diagrammatic, of pneumatic mechanism for producing an automatic cycle, and electrical control means therefor.

In order that a comprehensive understanding of the machine and the operation thereof may be had, the principal parts will first be briefly described without reference to detail. As has been indicated, the present machine is designed to supplant, and to improve upon, the previously available crude mechanism for cutting cores from ocean shells. Buttons are also presently obtained from sheets of plastic, either by punching or by boring. The punched blanks cannot be made from the most desirable plastic materials since it is too brittle and would shatter. Punched blanks, moreover, are generally operated upon while hot and pliable, and upon cooling are left with concave edges. They are inferior on that account. The present machine can be economically used to saw cores or button blanks from the higher quality plastic, or to saw perfect cores or blanks from the lower quality plastics.

The machine comprises a frame 10 which is supported on legs 12. The top 14 of the frame 10 may form a work supporting table located at a convenient height for use by an operator in a seated position. A sheet 16 of plastic material is shown supported on the table 14 for having blanks 17 sawed from it. The machine comprises an upper tubular saw 18, an upper ramrod 20, and a lower stationary back-peg 22 which engages and sustains the work piece in opposed relation to the upper saw. It also comprises a lower saw 24, a lower stationary ramrod 26, and an upper back-peg 28 which engages and sustains the work piece in opposed relation to the lower saw. The lower back-peg 22 and the lower saw 24 engage the work through an elongated narrow opening 30 which is formed in the table 14, and the upper saw after penetrating the work may enter the opening 30.

The saws surround and slidingly fit the associated ramrod heads. The back-pegs are of the same diameters as the opposed ramrod heads, so that the saws after passing through the work may pass into surrounding relation to the back-pegs. As the parts are shown in Figure 6, upper saw 18, ramrod 20 and back-peg 28 are in their uppermost positions. The lower saw 24 is shown in retracted position, the lower ramrod 26 is shown in its fixed, permanent position, and the lower back-peg is shown yieldingly supported in the position which it substantially occupies at all times.

The upper ramrod head 20 and the upper back-peg 28 may be moved downward into work engaging position by depressing a lever preliminary to the tripping off of an automatic sawing cycle. When so moved downward they are plainly visible and they show the operator the exact areas in which the saws will act, enabling him to determine whether or not the work piece requires readjustment. If the areas indicated are satisfactory a sawing cycle is initiated forthwith, but if the adjustment is not satisfactory the upper ramrod and back-peg are permitted to rise sufficiently to free the work piece and the work piece is readjusted until a satisfactory adjustment of it is obtained. The upper ramrod 20 and the upper back-peg 28 are then depressed into work clamping position and manually held down while an automatic cycle is tripped off.

The tripping of the automatic mechanism brings into play mechanism which detains the upper back-peg 28 in work clamping position, making it unnecessary for the operator to hold the lever 32 down with his hand. Each of the saws 18 and 24 is formed with cutting teeth on its work engaging end, the teeth having abrupt leading edges 34 and gently sloping trailing edges 36. The back-pegs 28 and 22 are formed with similar teeth to resist any tendency which the saw might have to rotate the work. The tooth area of each back-peg is like that of the opposed saw, but since each back-peg is inverted relative to the saw which it opposes, the abrupt tooth edges of a back-peg face toward the advancing abrupt tooth edges of the saw, and serve effectively to resist rotation of the work. The back-peg is of small enough diameter to be received within the tubular saw.

So long as both saws are actively cutting into the work, they substantially counterbalance one another with respect to any tendency to rotate the work. Each saw, as soon as it substantially enters the work, tends through bodily obstruction to oppose rotation of the work piece by the other saw.

The automatic cycle is initiated by depression of a foot operated switch which serves to close a cycle initiating circuit, causing a pneumatic valve member or slide bar 38 to be appropriately shifted for driving a piston 40 to the right. Rightward movement of the piston is effective through gearing to drive the lower saw 24 up and the upper saw 18 down. Both saws are constantly rotated from a motor 42 and, therefore, act to saw blanks or cores from the work piece as they are so moved. When the saws have cut through the work piece a limit switch is automatically tripped to cause the valve member 38 to be returned toward the left to the position in which it is illustrated in Figure 2. This reverses the movement of the piston 40, causing the parts to be returned to the normal or at rest positions illustrated in Figure 6.

The lower ramrod is immovable and hence serves, as the lower saw moves downward, to knock the cut blank or core from the saw. The upper ramrod is normally maintained in an elevated position at its upper limit of movement. In that position it knocks the core or blank from the upper saw as the saw moves upward.

With this preliminary explanation, a more detailed description is now in order. The motor 42 is supported from the frame 10 by its base 44, with the motor shaft 46 extending downward. A pulley 48 fast on the shaft 46 acts through a belt 50 to drive a pulley 52 which is fast on the lower end of a vertically disposed shaft 54. The shaft 54 is rotatively mounted in horizontal arms of a bearing bracket 56. The shaft 54 also has fast upon it a second pulley 58 which, through a belt 60, drives a further pulley 62. The pulley 62 is supported upon a horizontal portion of a bored stationary bracket 64, and has driving connection through a key 66 with a spindle 68 upon which the lower saw 24 is carried. The spindle 68 is moved up and down, as will be clearly explained. The pulley 62 rotates the spindle but does not participate in the up and down movement of the spindle.

A sleeve 70 which is held against rotation in a guide 72 is nevertheless free to slide vertically relative to the guide 72. The guide 72 is clamped to the frame by screws 78. The sleeve 70 has bronze bearing sleeves 82 and 84 fixed within it at its upper and lower ends, in which the spindle 68 is rotatively supported. A spacer sleeve 83 of slightly larger internal diameter than the sleeves 82 and 84 is interposed between the latter sleeves. The spindle 68 is formed at its upper end with a downwardly facing shoulder which bears downward against the upper end of the bearing sleeve 82. A nut 85, threaded into the lower end of the sleeve 70, bears upward against the sleeve 84. A reduced lower end portion of the spindle 68 has an abutment nut 86 screwed up on it in engagement with the nut 85, the abutment nut being secured in place by a lock nut 88. The spindle 68, while free to rotate relative to the sleeve 70, is compelled to move axially in unison with the sleeve 70.

A rod 90, guided for vertical movement in stationary guide bearings 92, has affixed to it a rack 94 which is driven in opposite directions by a pinion 96. The rod 90 also has affixed to it a rigid arm 98 which fits into a recess formed in the sleeve 70. Vertical movement of the rack 94 is transmitted through the rod 90 and the arm 98 to the sleeve 70, and is thence transmitted to the spindle 68 through the bearing sleeves 82 and 84. The arm 98 prevents rotation of the sleeve 70.

The spindle 68 carries at its upper end a chuck 100 of the collet type through which saws 24 of different diameters can be substituted one for another. The ramrod 26 comprises a rod 102 and a head 104 threaded thereon. When a saw 24 is replaced, the ramrod head 104 is also replaced by another similar head of appropriate size. The thread is so chosen that the torque to which it is subjected in the operation of the machine tends to tighten it on the rod rather than unscrew it from the rod. The lower end of the rod 102 is passed through a fixed arm 106 and is fixed in adjusted relation to the arm by a set screw 108. The set screw 108 is threaded through the arm 106 into engagement with the rod 102.

The shaft 54 also has fast upon it a spur gear 110 which drives a spur gear 112 fixed on a vertical shaft 114. The shaft 114 extends upward through a hollow slide rod 116 and on up through a bearing bushing 118 which is provided at the upper end of a surrounding stationary sleeve 120. The shaft 114 has fast upon its upper end a pulley 122 which, through a belt 124, and a further pulley 126, drives an upper saw spindle 128, the drive from the second pulley to the spindle being through a key 130 and a keyway 132.

The spindle 128 extends downward through a sleeve 134 with capacity for rotation in bearings 136 which are carried by the sleeve. The sleeve 134 is prevented from rotating but has capacity for vertical sliding movement in a hollow arm which is composed of two complementary members 138 and 140. The arm members are drawn together by screws 142 and 144 to clamp the sleeve 120 firmly, but to leave the sleeve 134 free to slide. A cap 146 is secured in fixed relation on the arm member 138 and serves as a support for pulley 126. The cap is formed with a bore through which the spindle 128 passes freely.

Vertical movements are transmitted to the spindle 128 by the sleeve 134. The spindle 128 is formed like the spindle 68 and is related to the sleeve 134 just as the spindle 68 is related to the sleeve 70, save that there is an inversion of the parts. The spindle 128 can move up and down in unison with the sleeve 134 relative to the arm members 138 and 140, the bearing cap 146 and the pulley 126, and it can rotate in unison with the pulley relative to the bearing cap, the arm members 138 and 140, and the sleeve 134.

Provision is made for securing tubular saws 18 of different diameters on the lower end of the spindle 128 by means of a collet type chuck 152. The ramrod 20 comprises a rod 154 which extends completely through the spindle 128 and the chuck 152, and a head 156 which is threaded onto the lower end of the rod. When one saw 18 is replaced by another of different diameter, a corresponding replacement of the ramrod head 156 is effected.

Counterclockwise rotation of the gear 96, which serves to raise the lower spindle carrying sleeve 70, serves simultaneously to lower the upper spindle carrying sleeve 134. The gear 96 meshes with a rack 158 which is adjustably affixed to a clamping sleeve 160 on the slide rod 116. The clamping sleeve is clamped in place by a screw 162, which screw may be backed off slightly to permit adjustment of the sleeve 160 relative to the rod 116 and then re-tightened. The rod 116 is formed with a reduced upper end portion, and with an upwardly facing shoulder at the lower end of such reduced portion. One end of a solid arm 164 surrounds the reduced upper end of the rod 116 and rests upon the shoulder, being retained in place by a nut 166 which is threaded on the rod 116. The arm has a broadened outer end which extends into a notch 168 formed in one side of the sleeve 134. The arm 164 serves both as a means for moving the sleeve 134 up and down and as a means for preventing rotation of the sleeve 134.

The sleeve 120 is formed with a side opening 170 through which the arm 164 extends, the opening being of sufficient height to accommodate the required vertical movements of the arm 164 and of sufficient width to accommodate limited angular horizontal adjustment of the arm.

The sleeve 120 is supported and fixed in position by a tubular pedestal 172, the pedestal being affixed to the table top 14 by screws 174 (one shown). The arm members 138 and 140 rest upon the upper end of the tubular pedestal 172, and, as previously noted, are normally clamped against movement relative to the stationary sleeve 120 by the screws 142 and 144. The arm members 138 and 140 are thus maintained at a fixed level.

Upon the arm member 138 there is affixed a stationary, two-armed standard 176. One arm of the standard 176 supports a fulcrum pin 178 for the hand lever 32, and the other includes an integral guide collar 180 for the rod 154. A collar 182 affixed to the rod 154 is engageable with the stationary collar 180 to limit upward movement of the upper ramrod. A further collar 184 is affixed to the rod 154 above the collar 180. A light compression coil spring 186 surrounds the rod 154, bearing at its lower end against the stationary collar 180 and at its upper end against the collar 184, and serving thereby to urge the rod 154 yieldingly to its upper limit of movement. The lever 32, which is formed with an opening for receiving the upper end of the rod 154, rests upon the collar 184, and is normally held up by the spring 186. Manual depression of the lever 32 forces the rod 154 downward, compressing the spring.

It has been mentioned that manual depression of the lever 32 also depresses the upper back-peg 28 into engagement with the work. The back-peg 28 is attached to a plate 188 which is connected to the lower ends of two parallel rods 190 and 192. The rods extend vertically upward. The rod 190 passes through lower and upper ears 194 which are formed on the arm member 138. The rod 192 passes upward through vertically aligned lower and upper guide ears 196 (one shown) and has its upper end disposed directly beneath the lever 32. A light compression coil spring 198 surrounds the rod 192, bearing at its lower end against the lower ear 196 and at its upper end against a collar 200 which is adjustably fixed on the rod 190. The spring 198 normally holds the collar 200 up in engagement with the upper ear 196. When the lever 32 is swung downward to depress the upper ramrod head 156 into engagement with the work, the downward thrust is also transmitted through the rod 192 to depress the upper back-peg 28 into engagement with the work.

When the work has been properly adjusted for cutting, the handle 32 is held down firmly while a foot actuated switch is operated to initiate a single automatic cycle of operations.

The mechanism which actuates the gear 96 for producing this cycle will be described presently, but for the moment reference will be confined to the effect produced by such mechanism upon the gear 96, and through the gear 96 upon the other operating parts. The first effect of the starting of a cycle is to drive the gear 96 counterclockwise as indicated by the arrow in Figure 3. This drives the rack 94 downward and the rack 158 upward to carry the lower and upper saws toward the work. Before either saw reaches the work, however, the upper back-peg 28 is automatically retained in its depressed, work clamping position independently of the operator, so that the operator can release the lever and have his hand free.

The arm 164 has affixed to it a downwardly extending rod 202 which is guided for vertical movement by an embossed portion of the bottom wall of the arm member 138. Below the arm 138 the rod carries a cylinder 204 in which a stiff compression coil spring 206 is confined. The spring bears at its upper end against the upper end of the cylinder and at its lower end against the head of a headed plunger pin 208 whose shank protrudes downward through and beyond the lower end of the cylinder in position to engage the upper side of the plate 188. The downward thrust of the pin 208 against the plate 188 is directly applied to the upper back-peg 28. The consequence is that the upper back-peg 28 is automatically held down against the work from a time prior to engagement of the work by the saws, throughout advancement of the saws into and through the work, and throughout the retraction of the saws up to a point at which both saws are definitely clear of the work.

When the upper back-peg first engages the work it clamps the work against the table top. When the upper ramrod first engages the work it clamps it against the lower back-peg. The work areas thus engaged are the very areas to be cut out as cores or blanks.

As the saws are making their cuts the danger of chipping is greatest and it is important that the material being blanked out be supported firmly and held securely against turning to avoid chipping. This is accomplished by the back-pegs. The upper back-peg bearing down through the work against the lower tubular saw effectively accomplishes the desired supporting and clamping action with reference to the blank which is being cut out from below. The lower back-peg bearing upward through the work against the upper tubular saw effectively accomplishes the desired supporting and clamping action with reference to the blank which is being cut out from above. The fact that each blank is clamped until cut through contributes importantly to the dependable production of commercially perfect blanks or cores.

The lower back-peg 22 is supported from the frame 10 through a bracket 210 which includes a sleeve portion 212. The back-peg 22 is affixed to an arm 214, carried at the upper end of a plunger 216, which is slidable in the sleeve portion 212 of the bracket 210. The sleeve portion 212 includes an inturned finger 218 which is received in a longitudinally extending channel 220 of the plunger 216 to prevent rotation of the plunger. The plunger 216 includes a lower threaded stem portion 222. The stem portion 222 extends freely downward through an end closure plug 224 which is threaded into, and covers, the lower end of the sleeve 212. A compression coil spring 226 surrounds the stem for urging the plunger 216 upward. The spring bears at its lower end against the plug 224 and at its upper end against the main body of the plunger. A nut 228 threaded on the stem 222 below the plug 224 limits upward movement of the plunger, and hence limits upward movement of the lower back-peg 22. The nut may be adjusted to locate the lower back-peg 22 at the desired level, substantially flush with the top of the table 14.

The gear 96 is fast upon a horizontal shaft 230. A gear 232, also fast upon the shaft 230, is driven to and fro by a rack 234, and serves through the shaft 230 to drive the gear 96. The rack 234 is secured upon, and actuated by, a piston rod 236, the rod, in turn, being rigidly affixed to the piston 40 which operates in a cylinder 240 of a pneumatic motor 242. In order to prevent unevenness of operation and possible chattering the piston rod is desirably connected also to a hydraulic stabilizing unit, such as the device known commercially as the Bellows Hydro-Check. While a stabilizer of the kind referred to would be used in practice, it is simply associated with the pneumatic motor 242 in the conventional way, forms no part of the novelty of the present invention, and is, therefore, not illustrated.

Compressed air from a suitable source (not shown) is supplied to, and exhausted from, opposite ends of the cylinder simultaneously, there being provision, as is well understood, for reversing the connections to the cylinder ends according to the direction in which the piston is to be driven. The control of these connections is effected through the slide bar 38 which cooperates with suitable passages for effecting the desired results. While these passages are normally provided in a chest or block, the pipe equivalent has been illustrated for simplicity of understanding.

As shown, the bar 38 has four transverse passages $a$, $b$, $c$ and $d$. A compressed air supply conduit 244 includes branches $b_1$ and $d_1$. An exhaust conduit 246 includes branches $a_1$ and $c_1$. A conduit 248 which communicates constantly with the left end of the cylinder 240 includes branches $a_2$ and $d_2$. A conduit 250 which communicates constantly with the right end of the cylinder 240 includes branches $b_2$ and $c_2$.

The parts are shown in Figure 2 in the normal or idle condition. The compressed air conduit 244 is in communication with the right end of the cylinder 240 through $b_1$, $b$, $b_2$ and 250. The exhaust conduit 246 is in communication with the left end of the cylinder 240 through $a_1$, $a$, $a_2$ and 248. When the bar 38 is moved to the right, $a$ and $b$ are rendered inactive and $c$ and $d$ are rendered active. The compressed air conduit 244 is then placed in communication with the left end of the cylinder 240 through $d_1$, $d$, $d_2$ and 248 and the exhaust conduit 246 is then placed in communication with the right end of the cylinder 240 through $c_1$, $c$, $c_2$ and 250 to move the piston toward the right. These latter connections are effective to move the piston to a right hand limit of movement at which point the bar 38 is automatically returned to the Figure 2 position to establish the Figure 2 connections. This causes the piston to return to the Figure 2 position and to remain there until a new cycle is manually tripped off.

Electrical mechanism is provided for controlling the bar 38 and thereby controlling the entire cycle of the machine. The bar 38 is provided with an armature member 252 of ferro-magnetic material. The armature 252 is responsive in common to two solenoid windings 254 and 256, being drawn to the right when the winding 254 is energized and being drawn to the left, as shown in Figure 2, when the winding 256 is energized. With the parts as shown in Figure 2, neither solenoid is energized, and the starting of the cycle requires that the solenoid 254 be energized. The switch 258 which is desirably a foot operated switch is accordingly depressed to close the cycle initiating circuit. Direct current now flows from a line conductor 260 through a conductor 262, switch 258, a conductor 264, winding 254 and conductor 266 back to the opposite line conductor 268. This shifts the bar 38 toward the right, setting the piston 40 into motion toward the right. As soon as the operator releases the treadle switch 258 the circuit is opened, but the bar 38 has been shifted and it retains the position to which it has been shifted until further actuated by the solenoid winding 256. The movement of the piston toward the right continues, therefore, until a projection 270 on the rack 234 engages the actuator 272 of a snap-acting toggle switch 274, and actuates it to close the switch.

This closing of the switch 274 causes current to flow from line conductor 260 through a conductor 276, switch 274, a conductor 278, winding 256 and conductor 266 back to line conductor 268. This causes the armature to be drawn to the left hand position as shown in Figure 2 so that the bar 38 is again caused to establish the connections shown in Figure 2. This reverses the piston, causing it to travel toward the left. As soon as the actuator 272 is disengaged the switch 274 is automatically opened, but the bar 38 has been shifted and will not again change position until further actuated by the winding 254. When the piston has returned to the Figure 2 condition there is no automatic reversal, and the parts simply remain in the condition shown until the treadle is again actuated to close the switch 258.

The switch 274 may be adjusted to vary the point of reversal of the piston as required by different classes of work. The switch 274 is affixed to a plate 280 which rests upon a fixed plate 282 having an elongated slot 284 formed through it. A headed screw 286 has its shank passed upward through the slot 284 and screwed into the plate 280. The screw may be tightened to clamp the switch in a desired location, and may be partially backed off to permit readjustment of the switch.

It has been mentioned that the clamping collar 160 may be adjusted longitudinally of the rod 116. The purpose of such an adjustment is to cause the upper and lower saws to engage the work simultaneously or substantially simultaneously, the adjustment being made when there is a change from one thickness of work to another thickness. When such an adjustment is to be made, the motor 42 is switched off to stop the saws, the clamping collar 160 is loosened relative to the rod 116, and the treadle is operated to start the piston 40 toward the right. When the lower saw comes into engagement with the work the piston will be stalled, with the gear 96, the rack 158 and the clamping collar 160 in definite positions which they should occupy as the upper saw meets the work. By pulling the upper saw downward into contact with the work with one hand and then tightening the sleeve 160 on the rod 116 with the other the desired relationship is established. The operator can then return the parts to the Figure 2 condition by tripping the switch 274 with his finger.

It will be observed that everything above the table which extends outward beyond the standard 172 is controlled in angular position about the axis of shaft 114 by the arm 138, 140. When the saw diameters are changed it is necessary to change the distance between the centers of the bores formed simultaneously by the saws. This is accomplished by adjusting the upper sawing mechanism angularly about the center of the sleeve 120. The clamping screws 142 are backed off slightly, the arm 138—140 is turned through the desired angle, and the screws 142 are retightened. This correctly relocates everything above the table in unison, except that the upper back-peg 28 has been moved out of alignment with the lower saw by the new adjustment. The upper back-peg 28, however, requires replacement by another back-peg to match the size of the substitute saw. The plate 188 is formed with a downturned flange 286, and an out-turned rib 287 at the upper extremity of the flange. Each back-peg is made unitary with a supporting bar 288, the bar having a reduced end portion passed through the back-peg and upset. A headed screw, passed through a bore formed in the bar 288 and threaded into a tapped hole in the flange 286, holds the back-peg in place. Different size back-pegs are mounted on bars of different effective lengths, so that each will be centered relative to the lower saw.

The described adjustment of the upper saw mechanism will carry the upper saw out of alignment with the lower back-peg 22. The lower back-peg is mounted similarly to the upper back-peg 28 and can be similarly replaced by a back-peg of appropriate diameter mounted on a bar of appropriate length.

I have described what I believe to be the best embodiments of my invention. I do not wish, however, to be confined to the embodiments shown, but what I desire to cover by Letters Patent is set forth in the appended claims.

I claim:

1. A machine for cutting a plurality of cores simultaneously from button material comprising, in combination, parallel, disaligned upper and lower saw spindles, tubular saws carried by the spindles, means constantly rotating the spindles, means for advancing the upper spindle in a downward direction and the lower spindle in an upward direction, simultaneously to cause the saws carried by the spindles to cut separate cores from the button material, and for then causing the spindles to be retracted, lower and upper back-pegs opposed to the respective saws, and upper and lower ramrods disposed centrally of the spindles and effective as the spindles recede to dislodge the cores from the saws.

2. A machine as set forth in claim 1 in which the means for advancing and retracting the spindles is normally inactive, but is adapted to be manually tripped and when tripped acts automatically to effect a single cycle of operation in which the spindles are simultaneously advanced and then simultaneously retracted to their initial positions of rest.

3. A machine as set forth in claim 1 in which the means for advancing and retracting the spindles comprises a pneumatic motor which includes a piston, gearing responsive to the piston for advancing the spindles as the piston moves forward and retracting the spindles as the piston returns, valve means controlling the piston, manually operable means for causing the valve means to assume a forward driving position, and means automatically responsive to the forward movement of the piston for causing the valve means to assume a reverse driving position.

4. A machine as set forth in claim 1 in which the means for advancing and retracting the spindles comprises a pneumatic motor which includes a piston, gearing responsive to the piston for advancing the spindles as the piston moves forward and retracting the spindles as the piston returns, a valve member controlling the piston, a manually operable switch, a solenoid in circuit with, and responsive to, said switch, for placing the valve member in a forward driving position, a limit switch automatically closed by forward movement of the piston, and a second solenoid in circuit with said limit switch and automatically responsive to it for placing the valve member in a return driving position.

5. A machine as set forth in claim 1 in which the means for advancing and retracting the spindles comprises a pneumatic motor which includes a piston, gearing responsive to the piston for advancing the spindles as the piston moves forward and retracting the spindles as the piston returns, a valve member controlling the piston, a manually operable switch, a solenoid in circuit with, and responsive to, said switch, for placing the valve member in a forward driving position, a reversing switch automatically closed by forward movement of the piston, a second solenoid in circuit with the reversing switch and automatically responsive to it for placing the valve member in a return driving position, and means for adjusting the point in the advance of the piston at which the reversing switch is actuated to reverse the direction of piston travel.

6. A machine for cutting cores from button material comprising, in combination, parallel upper and lower saw spindles, tubular saws carried by the respective spindles, means constantly rotating the spindles, lower and upper back-pegs opposed respectively to the upper and lower saws, upper and lower ramrods disposed respectively within the upper saw and spindle and within the lower saw and spindle, means yieldingly supporting the upper back-peg and the upper ramrod away from the work, means for manually displacing the upper back-peg and the upper ramrod to or toward the work to test the accuracy of location of the work for the next cutting operation and to effect a preliminary manually maintained clamping of the work, power mechanism adapted to be tripped and when tripped effective to produce a single mechanically controlled cycle in which the upper and lower spindles are simultaneously advanced to bring about sawing operations and are then simultaneously retracted to restore the parts to their original positions, said power mechanism also including means for mechanically clamping the upper back-peg against the work in advance of work engagement by the saws, thereby to relieve the operator of the necessity of manually clamping the work while it is being cut.

7. A machine for cutting cores from button material comprising, in combination, parallel upper and lower saw spindles, tubular saws carried by the respective spindles, means constantly rotating the spindles, lower and upper back-pegs opposed respectively to the upper and lower saws, upper and lower ramrods disposed respectively within the upper saw and spindle and within the lower saw and spindle, means yieldingly supporting the upper back-peg and the upper ramrod away from the work, means for manually displacing the upper back-peg and the upper ramrod to or toward the work to test the accuracy of locaton of the work for the next cutting operation, the upper back-peg and the upper ramrod being of appropriate shapes and sizes exactly to cover the work areas from which the cores will be cut, and being depressible firmly to clamp the work when the work has been properly positioned, and means for causing the spindles to advance and recede relative to the work.

8. A machine for cutting a plurality of cores simultaneously from button material comprising, in combination, parallel upper and lower saw spindles, tubular saws carried by the spindles, means constantly rotating the spindles, means for advancing the upper spindle in a downward direction and the lower spindle in an upward direction simultaneously, to cause the saws carried by the spindles to cut cores from the button material and for then causing the spindles to be retracted, lower and upper back-pegs opposed to the respective saws, upper and lower ramrods disposed centrally of the spindles and effective as the spindles recede to dislodge the cores from the saws, and means for adjusting one of the spindles relative to the spindle advancing mechanism and according to the thickness of the work, to cause the upper saw to enter the work from above substantially as the lower saw enters the work from below.

9. A machine for cutting a plurality of cores simultaneously from button material comprising, in combination, parallel upper and lower saw spindles, tubular saws carried by the spindles, means constantly rotating the spindles, means for advancing the upper spindle in a downward direction and the lower spindle in an upward direction simultaneously, to cause the saws carried by the spindles to cut cores from the button material and for then causing the spindles to be retracted, lower and upper back-pegs opposed to the respective saws, and upper and lower ramrods disposed centrally of the spindles and effective as the spindles recede to dislodge the cores from the saws, the means for rotating the upper spindle including a vertical drive shaft, and the mechanism driven by said shaft together with the supporting means for said spindle, the associated ramrod and operating means therefor, being angularly adjustable about the axis of said shaft so that the spacing of the spindles can be changed for different core diameters while maintaining the operative relation of the parts, the adjustment serving to maintain substantially the minimum permissible horizontal spacing of the spindles for various core sizes.

10. A machine as set forth in claim 9 in which the adjustment referred to carries the upper saw out of axial alignment with the lower back-peg and the upper back-peg out of axial alignment with the fixed axis of the lower saw, and means supporting the back-pegs with provision for quick back-peg substitution, so that back-pegs of appropriate diameters and having different lengths of supporting arms can be put in place to reestablish alignment of the back-pegs with the saws.

11. A machine for cutting a plurality of cores simultaneously from button material comprising, in combination, parallel, disaligned upper and lower saw spindles, tubular saws carried by the spindles, means constantly rotating the spindles, and means for advancing the upper spindle in a downward direction and the lower spindle in an upward direction simultaneously, to cause the saws carried by the spindles to cut separate cores from the button material, and for then causing the spindles to be retracted, the axes of the saw spindles being separated by a mechanically determined distance only slightly greater than the sum of the external radii of the saws so that the saws may be caused to clear one another but to operate in nearly contiguous relation when cutting through the button material.

References Cited in the file of this patent
UNITED STATES PATENTS

| 650,189 | Osborn | May 22, 1900 |
| 947,995 | Miller | Feb. 1, 1910 |
| 1,641,462 | Stohlgren | Sept. 6, 1927 |
| 1,713,695 | Gleich | May 21, 1929 |
| 2,500,724 | Weber et al. | Mar. 14, 1950 |
| 2,545,708 | Schmarje et al. | Mar. 20, 1951 |